April 21, 1942.   J. EGGERT ET AL   2,280,067
ENDLESS BAND OF FILM AND REPRODUCING APPARATUS FOR ITS USE Filed Aug. 31, 1938   3 Sheets-Sheet 1

Inventors
John Eggert
Hans Friedrich Nissen
By Their Attorney

April 21, 1942.    J. EGGERT ET AL    2,280,067
ENDLESS BAND OF FILM AND REPRODUCING APPARATUS FOR ITS USE
Filed Aug. 31, 1938    3 Sheets-Sheet 2

Inventors
John Eggert
Hans Friedrich Nissen
By Their Attorney

April 21, 1942.   J. EGGERT ET AL   2,280,067
ENDLESS BAND OF FILM AND REPRODUCING APPARATUS FOR ITS USE
Filed Aug. 31, 1938   3 Sheets-Sheet 3

Inventors
John Eggert
Hans Friedrich Nissen
By Their Attorney

Patented Apr. 21, 1942

2,280,067

UNITED STATES PATENT OFFICE 2,280,067

ENDLESS BAND OF FILM AND REPRODUCING APPARATUS FOR ITS USE

John Eggert, Leipzig, and Hans Friedrich Nissen, Dessau, Germany, assignors, by mesne assignments, to General Aniline & Film Corporation, New York, N. Y., a corporation of Delaware Application August 31, 1938, Serial No. 227,788
In Germany September 1, 1937

1 Claim. (Cl. 88—18.7)

This invention relates to a more of coiling an endless band film, which has the form of a non-twisted loop.

For several purposes band films are used in the form of an endless loop. For instance such films have been proposed for recording and reproducing sound records so as to make a sound film for use as a gramophone record; such a film, owing to its length, can carry a number of sound tracks side by side, thus affording a considerably longer period of recording a reproduction than is possible with a disc. Instead of a mechanical sound track, a photographic sound track is used. These endless band films are generally coiled on a single spool. The film then runs from the interior of the coil and returns on to the exterior of the coil. Such an endless wound film presents the difficulty that when it is completely unwound, as for instance is necessary for developing the film, it forms a loop many times twisted on itself. In order to avoid this objection the endless loop of film, before its development or other treatment in which the whole coil must be unwound, has been cut and, when the operation upon its has been completed the ends have been joined together again. In this manner, however, there is always a piece of the film lost and thus, especially in sound records, there is an unpleasant disturbance.

It is an object of our invention to overcome these difficulties by providing a reproducing apparatus which supports an endless non-twisted film in two coils which are so arranged that they may be completely unwound without the introduction of kinks or twists in the resulting single loop of film.

Another object is to provide a process in which the film is so wound that it forms two coils having the same number of turns and the same direction of winding.

A further object of the invention is the provision of a process in which a film having free ends is wound to form a single coil and the outer or inner end of the film is passed between two turns of the coil at such a place that on each side of this end there will be the same number of turns of the coil. The two ends of the film are then stuck together. One can now completely unwind the coil and obtain a loop of film which is not twisted upon itself.

A still further object of our invention is to provide a mode in which the endless loop of film is coiled on to a core so that two coils of the same number of turns exist side by side. The film can then be caused to leave the core from the outer turn of the one coil and to return to the core to form the inner turn of the other coil. The two coils may be side by side on the core. The core may advantageously be so formed that at the outer edges of the coils it tapers conically. Yet another object of the invention is the provision of an endless non-twisted film coiled so as to constitute two coils with the same number of turns and wound in the same direction.

Further objects of the invention will appear from the following description.

Reference is made to the accompanying drawings in which

Figure 1:
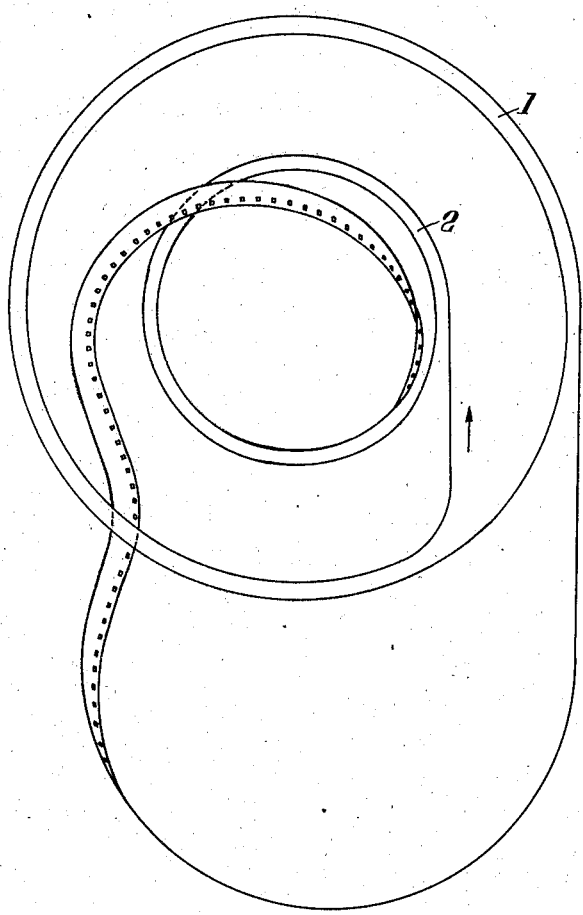
Fig. 1 is a view of an endless band of film wound in two concentric coils, said view being taken along the axis of the coils.
Figure 2:
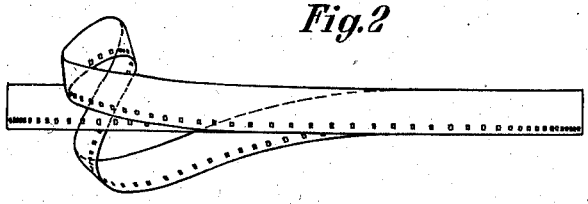
Fig. 2 is a side view of the coils of Fig. 1.
Figure 3:
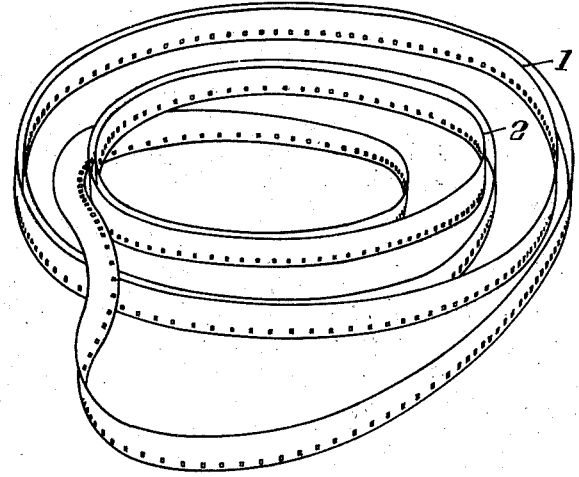
Fig. 3 is a perspective view of the said coils.

Figs. 1, 2 and 3 show a mode of coiling an endless film loop so that it consists of a two part coil, an outer part 1 and an inner part 2. Both parts have the same number of turns. The film is wound in the same sense. It runs from the inner surface of the part 2 outwards, passes between the two parts, runs outside on to the part 1 and from the inner surface of this part back to the outer surface of part 2. When the coil is completely unwound, there is obtained an endless non-twisted loop of film.

Figure 4:
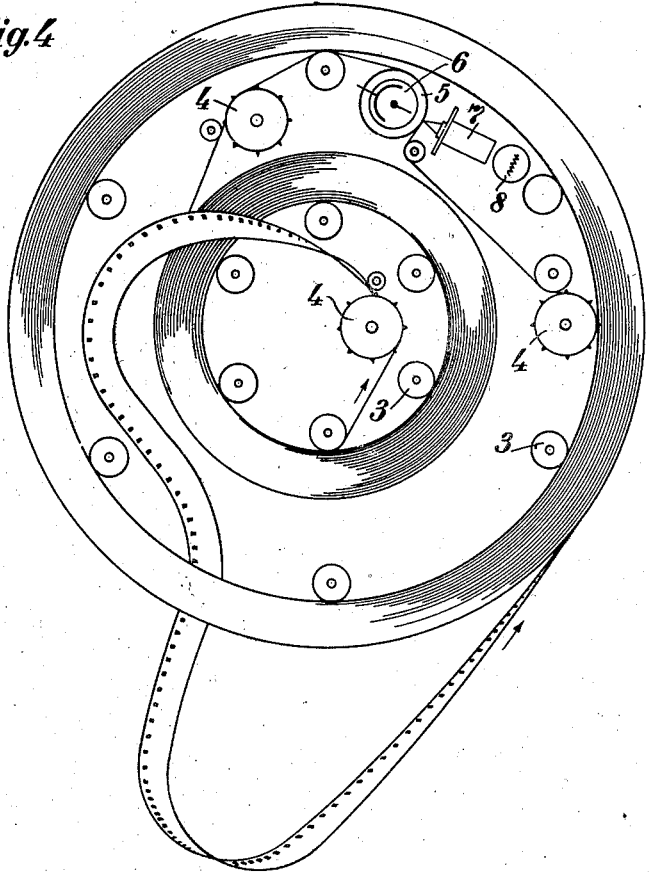
Fig. 4 is a view of a sound reproduction apparatus embodying concentric coils wound according to the present invention.

Fig. 4 shows how such a coiled film may be used for reproducing sound. The film is wound as described in relation to Figs. 1, 2 and 3. At the inner surface of each part of the coil there are guide rollers 3. The film is driven by several toothed rollers 4. Between the outer and inner parts of the coil is the device for scanning the sound record; alternatively this device may be within the inner or without the outer part; it is here shown to consist of a hollow sound roller 5 in which the photo-cell 6 is placed, the sound lens 7 and the sound lamp 8. The parts of the coil may be eccentrically placed instead of concentrically as shown.

Figure 5:
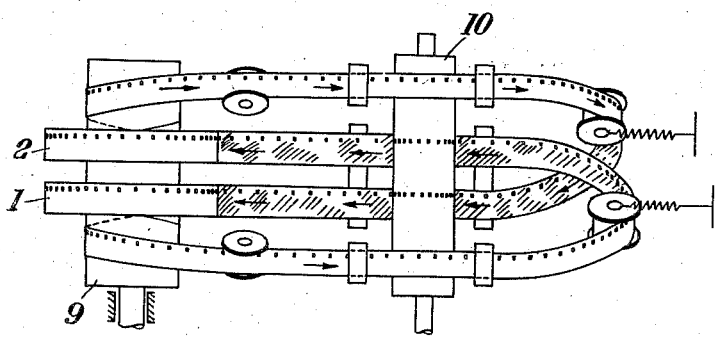
Fig. 5 is a top view of two coils wound side by side according to another embodiment of the invention.

Fig. 5 shows a construction in which the two parts 1 and 2 of the coil are side by side on the same core 9. The film runs as indicated by the arrows from the interior of the one part of the coil to the exterior of the other part. It is guided outside the coil over a toothed drum 10 with which it makes contact four times, so that it is well supported.

Figure 6:
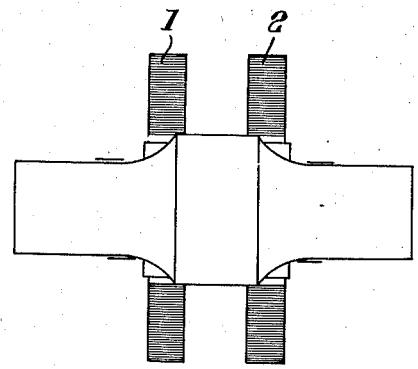
Fig. 6 is a view of a preferred form of core for the coils of Fig. 5, said coils being shown in section.

Fig. 6 shows a preferable form of the core 9 indicated in Fig. 5. The core tapers conically at the outer edges of each part of the coil in order that in this manner the lateral withdrawal of the innermost turn is facilitated. The spools may be closely side by side and indeed with their adjacent faces in contact, without involving any disturbance, since both parts of the coil move in the same direction and at the same speed.

A special advantage of the invention is that by the arrangement of the film in two coils friction of the several layers of film against each other is diminished.

We claim:

A reproducing apparatus for an endless non-twisted film, said apparatus including a scanning device for the film, means supporting the film in two spaced concentric coils each coil having the same number of turns and each being wound in the same direction, and means for guiding and moving the film from the inside of the outer coil to the outside of the inner coil and from the inside of the inner coil between the coils to the outside of the outer coil, said film passing through said scanning device as it is guided from one coil to the other coil.

HANS FRIEDRICH NISSEN.
JOHN EGGERT.